US007623957B2

(12) United States Patent
Bui et al.

(10) Patent No.: US 7,623,957 B2
(45) Date of Patent: Nov. 24, 2009

(54) SYSTEM, METHOD, AND COMPUTER PROGRAM PRODUCT FOR OPTIMIZING CRUISE ALTITUDES FOR GROUPS OF AIRCRAFT

(75) Inventors: Vu P. Bui, Renton, WA (US); Dian G. Alyea, Algona, WA (US); Alan E. Bruce, Kent, WA (US); Kenneth S. Chun, Seattle, WA (US); Marissa K. Singleton, Bellevue, WA (US); Steve Kalbaugh, Boca Raton, FL (US)

(73) Assignee: The Boeing Company, Chicago, IL (US)

( * ) Notice: Subject to any disclaimer, the term of this patent is extended or adjusted under 35 U.S.C. 154(b) by 502 days.

(21) Appl. No.: 11/515,121

(22) Filed: Aug. 31, 2006

(65) Prior Publication Data

US 2008/0059052 A1 Mar. 6, 2008

(51) Int. Cl.
*G01C 23/00* (2006.01)
*G06F 19/00* (2006.01)

(52) U.S. Cl. .............................. 701/120; 701/4; 701/11; 342/36; 244/158 R

(58) Field of Classification Search ..................... 701/3, 701/4, 11, 120, 123, 204, 208; 705/6, 10, 705/400; 244/158 R; 340/947, 962; 342/36
See application file for complete search history.

(56) References Cited

U.S. PATENT DOCUMENTS 4,706,198 A 11/1987 Thurman (Continued)

FOREIGN PATENT DOCUMENTS

WO WO 02/095712 11/2002

OTHER PUBLICATIONS

Notification of Transmittal of the International Search Report and the Written Opinion of the International Searching Authority, or the Declaration, Jun. 24, 2008, European Patent Office (12 pgs).

*Primary Examiner*—Tan Q Nguyen
(74) *Attorney, Agent, or Firm*—Toler Law Group

(57) ABSTRACT

Embodiments provide systems, methods, and computer program products for optimizing cruise altitudes for multiple aircraft. The embodiments may be used for optimizing cruise altitudes of multiple aircraft on multiple flight paths and/or system capacity by an operator and/or an air navigation service provider. According to exemplary embodiments, a first set of optimum initial cruise altitudes are established for a plurality of aircraft. Weather conditions at the first set of optimum initial cruise altitudes are accounted for to establish a second set of optimum initial cruise altitudes. Direction of flight at the second set of optimum initial cruise altitudes is accounted for to establish a third set of optimum initial cruise altitudes. Any conflicts between aircraft at the third set of optimum initial cruise altitudes are detected. When a conflict is detected, the conflict is resolved to establish a fourth set of optimum initial cruise altitudes.

45 Claims, 7 Drawing Sheets

U.S. PATENT DOCUMENTS

| | | | | |
|---|---|---|---|---|
| 6,134,500 | A * | 10/2000 | Tang et al. | 701/202 |
| 6,163,743 | A | 12/2000 | Bomans et al. | |
| 6,314,362 | B1 * | 11/2001 | Erzberger et al. | 701/120 |
| 6,604,044 | B1 | 8/2003 | Kirk | |
| 7,194,353 | B1 * | 3/2007 | Baldwin et al. | 701/206 |
| 7,228,207 | B2 * | 6/2007 | Clarke et al. | 701/3 |
| 2004/0193362 | A1 * | 9/2004 | Baiada et al. | 701/120 |
| 2006/0069497 | A1 | 3/2006 | Wilson | |
| 2006/0089760 | A1 * | 4/2006 | Love et al. | 701/4 |
| 2008/0004792 | A1 * | 1/2008 | Wise et al. | 701/120 |

* cited by examiner

SYSTEM, METHOD, AND COMPUTER PROGRAM PRODUCT FOR OPTIMIZING CRUISE ALTITUDES FOR GROUPS OF AIRCRAFT

BACKGROUND

Air traffic management (ATM) system analysts simulate and model flights traveling through a region of airspace to analyze how future improved concepts support new capacity and efficiency improvements while maintaining or improving existing safety standards. A typical airspace study analyzes a schedule of multiple flights and determines the route and altitude each aircraft will fly.

Schedules of flights may be found in the Official Airline Guide (OAG). The OAG defines the aircraft type (such as Boeing 737, Airbus A320, and the like) as well as the departure and arrival times for thousands of flights world-wide every day. However, the OAG does not contain any information about the route or the altitudes of the flights. Therefore, four-dimensional (4-D) (x, y, z, time) trajectory flight path data must be supplied by the airspace simulation, based upon a number of factors, including the aircraft's cruise altitude capability and winds aloft, airspace restrictions and constraints, and the like.

Currently, there are no methods for planning the distribution of flights and cruise altitudes in the oceanic and remote airspace regions to optimize operations for all operators. Large numbers of aircraft fly across the oceans of the world. For example, over 1200 flights travel across the North Atlantic airspace every day. The planning task is made more difficult because of large separations between aircraft due to lack of radar or VHF voice communication coverage in these areas. HF voice communication or satellite-based communications are used in these regions for controller to pilot communications. However, aircraft are separated in these remote regions by larger lateral and longitudinal distances than if radar and VHF voice communications were available.

Thus, for several reasons, it would be desirable to provide collaborative methods for modeling and planning flight routes and altitudes in the oceanic and remote airspace. As a first example, in current air traffic control (ATC) practice, controllers handle aircraft one-by-one, on a "first-come, first-served" basis. The first airplane to enter the airspace is given the best available position regardless of the needs of individual operators, thereby affecting all following aircraft. A typical effect is that an aircraft capable of a faster cruise speed may follow a slower aircraft at the same cruise altitude. The faster aircraft must slow down or be vectored until there is enough space to allow the faster aircraft to safely pass the slower aircraft. Increasing use of slower regional jets and small business jets (that generally may have cruise speeds less than Mach 0.8, typically Mach 0.77 or less) demonstrates the limitations of the first-come, first served policy.

Another limitation of a first-come, first-served methodology manifests itself in inefficient flight routings (whether due to extended routes or inefficient flight altitudes). The air traffic controller is responsible for safely separating aircraft in a given three-dimensional volume of airspace called a "sector". Controllers in adjacent sectors communicate with each other (currently using primarily a land-line phone) when an aircraft is about to enter another controller's airspace.

Currently, attempts are made to coordinate the movements of large numbers of aircraft through functions called flow and traffic management. However, flow and traffic management functions do not ensure that an aircraft will not be given an inefficient flight route. This is primarily because the ultimate responsibility for safe separation of aircraft resides with the controller responsible for a given sector. Thus, even if flow and traffic management functions have identified plans and constraints for a group of aircraft, variations in near-term operational parameters (such as changes to forecast/current weather, flight winds aloft differences from predicted, operational changes, or equipment failures) can result in the sector controller imposing additional restrictions on a flight if it is necessary to achieve safe separation distances between aircraft.

For example, in a typical case the flow and traffic management functions may have identified (through agreed-upon standard operating procedures or daily plans) aircraft separation distances. The controllers responsible for separating traffic at the typical cruise altitudes build in a gap or "slot" for the aircraft climbing up to cruise altitudes. However, one of the aircraft (aircraft A) may be late departing the airport due to ground congestion on one of the taxiways. Therefore, aircraft A will not fit into the gap available in the traffic flow. The controller responsible for this aircraft must find a way to safely separate aircraft A from the rest of the aircraft in the sector. The controller may let aircraft A cruise at a lower flight altitude until a gap in the traffic stream is established and aircraft A can be allowed to climb. Alternately, the controller may alter aircraft A's course until the aircraft can safely join a different gap in the traffic. In either case, aircraft A takes a less efficient path due to an increase in time and fuel consumed.

Another reason why it would be desirable to provide collaborative methods for modeling and planning flight routes and altitudes in the oceanic airspace is to improve airspace utilization.

Airspace spaces/slots not utilized are perishable assets. Like seats on an aircraft, once the space/slot is not used, it provides no benefit to the air traffic control service provider. Better methods for allocating spaces would reduce the numbers of unused spaces/slots, thereby conferring a benefit in the oceanic airspace because of the value of a single slot on an oceanic track.

Every day, flights crossing the vast expanses of the world's oceans enter what is called "oceanic" airspace. When flights enter oceanic airspace, two things happen: (1) the aircraft no longer directly communicates with the air traffic control (ATC) agency via VHF voice radio but uses satellite communications or HF voice/datalink (which means that the communication between the aircraft and ATC takes longer to conduct); and (2) the aircraft become separated from each other by large distances (such as up to 15 flight minutes in-trail longitudinally and 100 nm laterally). Therefore, because of the large separation standards applied in the oceanic airspace, any unused slot/space represents lost value primarily to the ATC service provider, but also to the operators.

Another reason why it would be desirable to provide collaborative methods for modeling and planning flight routes and altitudes in the oceanic airspace is to utilize shared information in a network-enabled environment to allow airlines to participate in collective flight routing decisions and optimize their individual aircraft flight profiles.

ATC service providers and aircraft operators generally cooperate to understand the weather and other conditions affecting the nation and adjacent parts of the world. However, for competitive and legal reasons, airlines generally do not share detailed flight plan information with each other. There are some efforts underway to improve information sharing, through working groups such as the Collaborative Decision Making Team and Inbound Priority Sequencing. These efforts are primarily directed at airline operators, although military and general aviation (including business jet operators) comprise a significant percentage of flights (approximately 20% or more, depending on the region of airspace being studied). These methods do not provide a basis for all aircraft operators and the air navigation service provider to optimize their operations. Instead, these activities primarily benefit the airlines (with the benefit to the air navigation service provider as a secondary benefit, rather than a primary benefit). Flights are planned individually, primarily due to existing regulatory requirements and other factors, including: (1) specific mission requirements (number of passengers, cargo, flight length, estimated winds aloft, and the like); (2) differing operational constraints in different regions; and (3) last minute aircraft configuration or payload changes that may affect aircraft weight or other operational factors for the flight.

Thus, present industry practices and methods for conducting flow planning do not provide a means to optimize cruise altitudes and system capacity for the air navigation service provider and the operators at the same time. Current methods optimize cruise altitudes for operators or system capacity for the service provider, but not both at the same time. Also, current flight planning methods optimize flight altitudes for a single aircraft operating on a single route, but not multiple aircraft on multiple flight paths.

The foregoing examples of related art and limitations associated therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems and methods which are meant to be exemplary and illustrative, not limiting in scope. In various embodiments, one or more of the problems described above in the Background have been reduced or eliminated, while other embodiments are directed to other improvements.

Embodiments provide systems, methods, and computer program products for optimizing cruise altitudes for multiple aircraft. The embodiments may be used for optimizing cruise altitudes of multiple aircraft on multiple flight paths and/or system capacity by an operator and/or an air navigation service provider.

According to embodiments, cruise altitudes are optimized for multiple aircraft. A first set of optimum initial cruise altitudes are established for a plurality of aircraft. Weather conditions at the first set of optimum initial cruise altitudes are accounted for to establish a second set of optimum initial cruise altitudes. Direction of flight at the second set of optimum initial cruise altitudes is accounted for to establish a third set of optimum initial cruise altitudes. Any conflicts between aircraft at the third set of optimum initial cruise altitudes are detected. When a conflict is detected, the conflict is resolved to establish a fourth set of optimum initial cruise altitudes.

According to an aspect, data regarding the third set of optimum initial cruise altitudes or, if any conflicts have been resolved, the fourth set of optimum initial cruise altitudes may be distributed to at least one user. Preference data regarding route assignment and/or altitude assignment may be received from at least one user, and the received user preference data may be accounted for to establish a fifth set of optimum initial cruise altitudes.

According to another aspect, in establishing the first set of optimum initial cruise altitudes each flight in a set of scheduled flights may be assigned to its own flight level based upon a probable altitude density distribution curve. Cruise altitudes are based upon reduced vertical separation minimums (RVSM) rules.

According to another aspect, weather conditions may be used to adjust the probable altitude density distribution curve to establish the second set of optimum initial cruise altitudes. The weather conditions may include any one or more of wind conditions (such as direction and speed) and temperatures at cruise altitude, thunderstorm activity, turbulence, and the like. Also, the weather conditions may include forecast weather conditions and/or observed weather conditions.

According to another aspect, direction of flight of aircraft may be accounted for. An aircraft may be assigned to the higher of the altitude assigned from the second set of optimum initial cruise altitudes or a performance ceiling altitude. An adjusted altitude may be assigned to the flight when the assigned altitude is not a standard altitude for the direction of flight.

According to another aspect, a conflict may be detected by determining whether at least two aircraft at a same altitude are scheduled to arrive at a same waypoint at less than a predetermined difference in time and/or distance. Conflicts may be checked for in a pair of altitude levels at a time. When a conflict is detected, the conflict may be resolved by re-assigning altitudes to a least number of flights to resolve the conflict.

In addition to the exemplary embodiments and aspects described above, further embodiments and aspects will become apparent by reference to the drawings and by study of the following detailed description.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

By way of overview, embodiments provide systems, methods, and computer program products for optimizing cruise altitudes for multiple aircraft. The embodiments may be used for optimizing cruise altitudes of multiple aircraft on multiple flight paths and/or system capacity by an operator and/or an air navigation service provider. Still by way of overview, a first set of optimum initial cruise altitudes are established for a plurality of aircraft. Weather conditions at the first set of optimum initial cruise altitudes are accounted for to establish a second set of optimum initial cruise altitudes. Direction of flight at the second set of optimum initial cruise altitudes is accounted for to establish a third set of optimum initial cruise altitudes. Any conflicts between aircraft at the third set of optimum initial cruise altitudes are detected. When a conflict is detected, the conflict is resolved to establish a fourth set of optimum initial cruise altitudes. Details will be set forth below.

An overview will first be set forth regarding exemplary functions that work together to optimize cruise altitudes for multiple aircraft. Next, details of processing blocks will be explained in the context of an exemplary method that can execute the functions. Lastly, an exemplary host environment for a system that can host the functions will be explained.

Functional Overview

Figure 1:
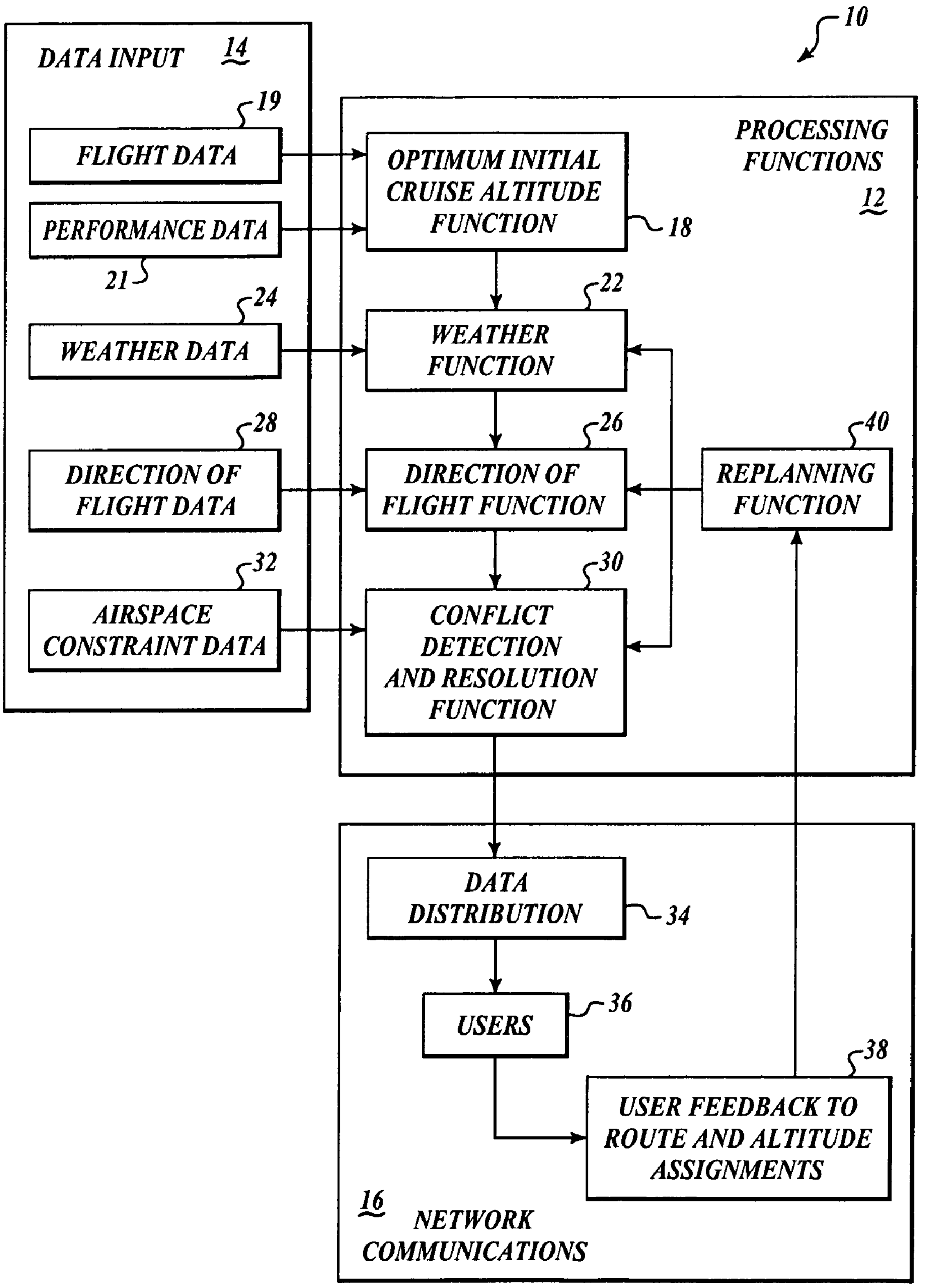
FIG. 1 is a functional block diagram of exemplary functions performed for optimizing cruise altitudes for multiple aircraft.

Referring now to FIG. 1, exemplary functions 10, including processing functions 12, data input functions 14, and network communications 16, work together to optimize cruise altitudes for multiple aircraft. The processing function 12 develops a set of optimum initial cruise altitudes for multiple aircraft. The data input function 14 provides data to the processing function 12 to enable the processing function 12 to refine the cruise altitudes. The network communications function 16 can provide feedback to enable to processing function 12 to re-plan the cruise altitudes.

Figure 2:
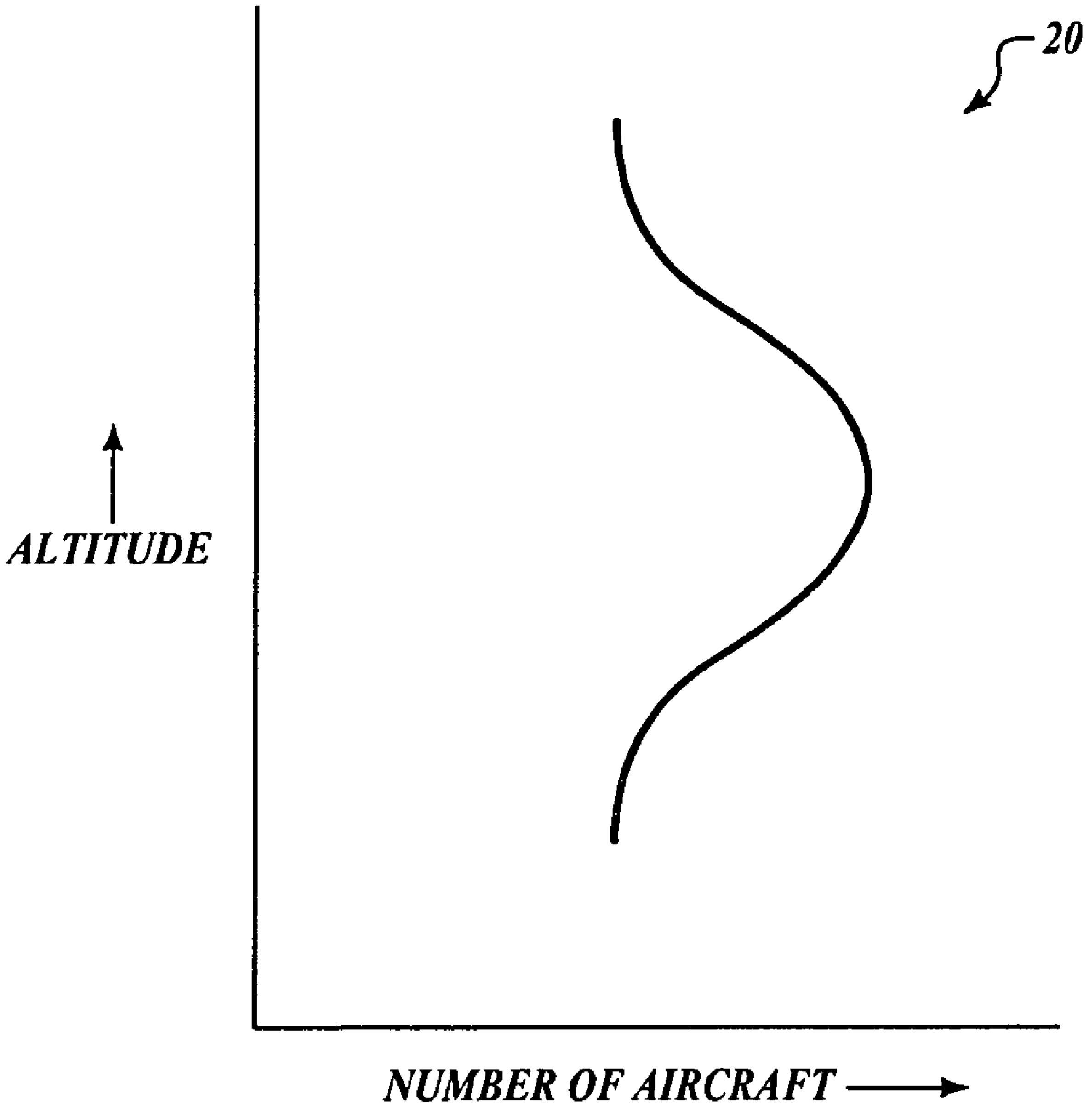
FIG. 2 is a probable altitude density distribution curve.

An optimum initial cruise altitude function 18 establishes a first set of optimum initial cruise altitudes for multiple aircraft. Four-dimensional (4-D) flight path information is based upon a flight data source 19 that includes filed flight plans, active flight plans, operator requests, or other flight data sources. The 4-D flight path information is also compared against a reference aircraft performance database 21. Referring additionally to FIG. 2, in an exemplary embodiment the optimum initial cruise altitude function 18 suitably assigns each flight in a set of scheduled flights to its own flight level based upon a probable altitude density distribution curve 20. The probable altitude density distribution curve 20 plots altitude versus the probability that an aircraft is expected to be at the altitude. The probable altitude density distribution curve 20 is based on observed data and approximates a normal distribution curve. It has been observed that certain altitudes are preferred along certain routes due to strength of the winds at the cruise altitudes. For example, it is desirable for flights heading westbound from Europe to the United States (that is, against the prevailing winds) to minimize exposure to excessive prevailing headwinds. Weather forecasts are available to all aircraft operators, and therefore the forecast winds are known. Those forecasts yield several preferred routes and cruise altitudes. The preferred altitudes will sustain a disproportionate share of traffic and other flight levels could be almost vacant.

In an exemplary embodiment, the optimum initial cruise altitude function 18 reads a flight's cruise altitude from the flight data source 19 and verifies the flight's cruise altitude according to reduced vertical separation minimums (RVSM) flight rules, subject to an aircraft's ceiling constraint. Under RVSM, opposite direction aircraft traveling between flight levels FL290 and FL410 are separated by 1000 vertical feet, based upon direction of flight. RVSM rules were implemented in U.S. domestic airspace in January 2005. Prior to 2005, the traffic was separated in U.S. domestic airspace by 2000 vertical feet, although RVSM was already used in several regions of the world, including Canada and the North Atlantic oceanic airspace.

A weather function 22 uses weather data 24 to adjust the probable altitude density distribution curve 20 to establish the second set of optimum initial cruise altitudes. The weather data 24 may include any one or more of wind conditions (such as direction and speed) and temperatures at cruise altitude, thunderstorm activity, turbulence, and the like. The weather data 24 may include forecast weather conditions and/or observed weather conditions. The weather data 24 may be provided by weather services, agencies such as the National Oceanic and Atmospheric Administration (NOAA), aircraft flying at cruise altitude, and the like.

A direction of flight function 26 uses direction of flight data 28 to account for direction of flight to establish the third set of optimum initial cruise altitudes. Information regarding preferred direction of flight is developed from flight rules/regulations and the ground track between the departure and arrival airports, adjusted as desired for air traffic control system special procedures. The direction of flight function 26 uses as a starting point the second set of optimum initial cruise altitudes generated by the weather function 22. Accounting for direction of flight serves two purposes. First, if used for day-of-flight analysis, the operators' requested preferred altitude for one flight in its schedule or the aircraft best performance cruise altitude instead of ceiling is used for a flight. Second, if the algorithm is used in a simulation study and an operator preference is not available, the algorithm uses a reference source of aircraft preferences (from the aircraft performance database 21 or like source) and adjusts the altitudes for weather and direction of flight, thus helping to assign an aircraft to an appropriate flight altitude more accurately.

A conflict detection and resolution function 30 uses airspace constraint data 32 to replicate effects of the first-come, first-served policy used by air traffic controllers. The conflict detection and resolution function 30 identifies any conflicts and determines any adjustments that should be made to cruise altitudes in order to resolve the detected conflict. Adjustments made to cruise altitudes in order to resolve any detected conflict establish a fourth set of optimum initial cruise altitudes.

In general, the conflict detection and resolution function 30 analyzes a set of predicted crossing times where conflicts are likely to occur by analyzing all waypoints along all flight paths that may have conflicts. A search analysis is conducted to determine what combination of altitudes will put the least number of aircraft at lower altitudes to resolve the conflicts.

In an exemplary embodiment, a conflict may be detected by determining whether at least two aircraft are scheduled to arrive at a same waypoint at less than a predetermined difference in time. That is, a conflict occurs if two or more flights are scheduled to come to a waypoint at the same time or if the time or distance separation between the aircraft at the waypoint is less than the distance or time constraint entailed in safe separation. As will be discussed in detail below, conflicts may be checked for in a pair of altitude levels at a time. When a conflict is detected, the conflict may be resolved by several standard methods (including lateral passing, climbing, slowing, speeding up, descending). As an example, re-assigning an aircraft to a lower flight altitude than another aircraft may resolve the conflict. In such a case, the lower altitude may be one altitude level lower than the altitude of the flight causing the conflict.

A data distribution function 34 distributes to users 36 data from the processing functions 12. When no conflicts have been detected, data regarding the third set of optimum initial cruise altitudes may be distributed to the users 36. When a conflict has been detected and resolved by the conflict detection and resolution function 30, data regarding the fourth set of optimum initial cruise altitudes may be distributed to the users 36.

The users 36 suitably are stakeholders in the air traffic control system who have subscribed to the data. As such, the users 36 may include air traffic control and air navigation control services (such as FAA and the like). The users 36 may also include operators, such as airlines, corporate aviation departments, business jet fractional ownership companies, and the like. The users 36 may review the data to which they have subscribed and formulate any desired trajectory requests, changes to route assignments, changes to altitude assignments, or the like. For example, an operator may desire, for one reason or another, to have longer flights flown at higher altitudes than shorter flights.

When desired, the users 36 may invoke a user feedback function 38 to provide feedback to route and altitude assignments. In the example mentioned above in which an operator may desire to have some flights flown at higher altitudes than other flights, the operator may submit revised trajectory requests via the user feedback function.

The user feedback function 38 invokes a replanning function 40 that accommodates the user feedback. The replanning function invokes a feedback loop that inputs the user feedback and includes the weather function 22, the direction of flight function 26, and the conflict detection and resolution function 30. Requested flight altitude changes are verified against RVSM rules. As a result of including user feedback, a collaborative decision-making process can include all stakeholders—that is, air traffic service providers and all operators.

Exemplary Method

Figure 3:
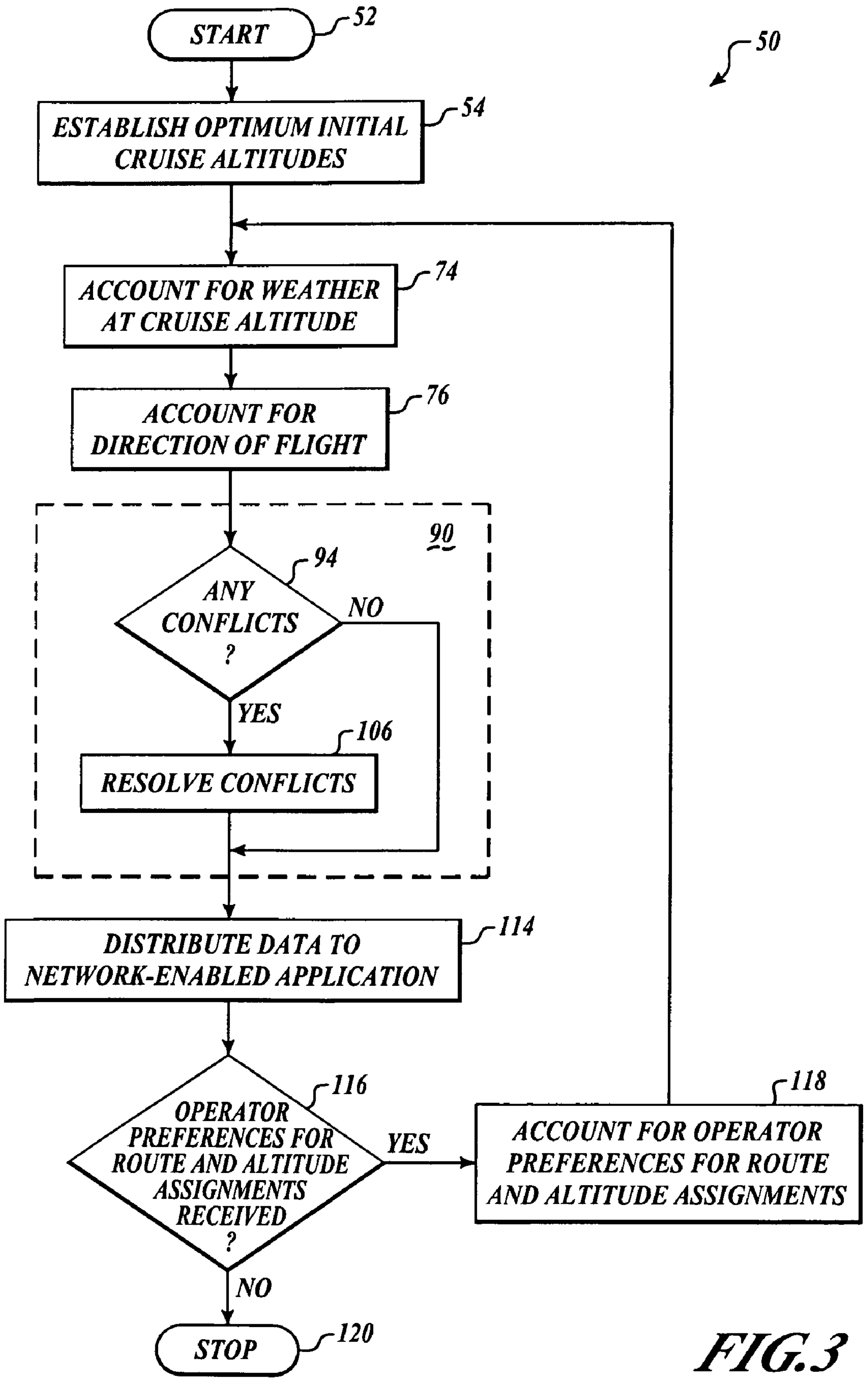
FIG. 3 is a flow chart of an exemplary method for executing the functions shown in FIG. 1.

Now that an overview has been given in functional terms, an exemplary method will be explained. Referring additionally now to FIG. 3, an exemplary method 50 starts at a block 52.

Figure 4:
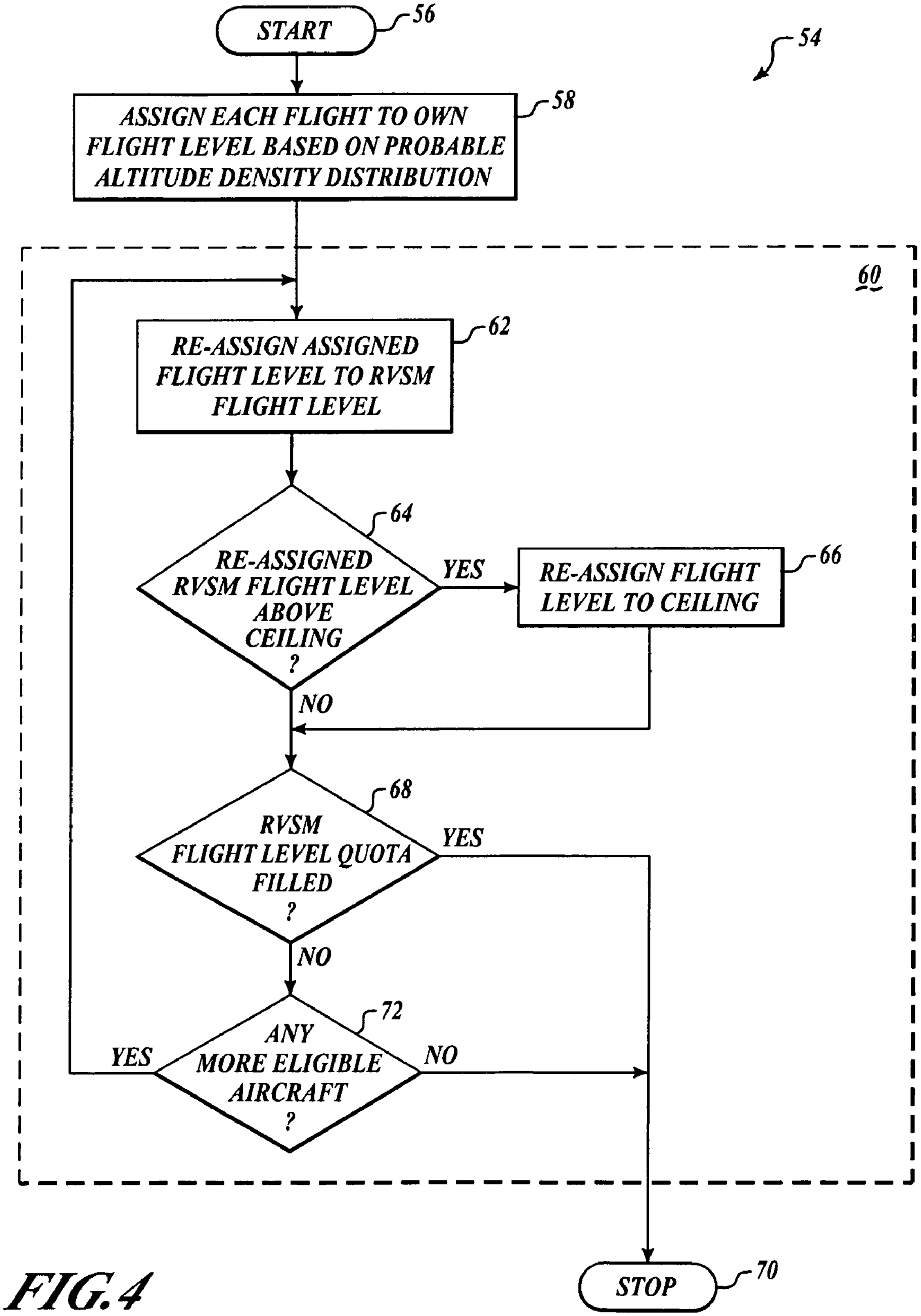
FIGS. 4, 5, and 6 are flow charts that show details of portions of the method shown in FIG. 2.

At a block 54, optimum initial cruise altitudes are established. Processing at the block 54 implements the optimum initial cruise altitude function 18 and establishes a first set of optimum initial cruise altitudes for multiple aircraft. Referring now to FIG. 4, details of exemplary processing at the block 54 will be explained. Processing at the block 54 starts at a block 56. At a block 58, each flight in a set of scheduled flights may be assigned to its own flight level based upon the probable altitude density distribution curve 20. The probable altitude density distribution curve 20 is based upon a database of weather data (including winds and temperatures aloft) and a database of three-dimensional (3-D) flight distributions that correspond to the database of weather data. This curve corresponds to expected flight density distributions. Based upon expected winds aloft, certain flight altitudes can be preferred. These preferred altitudes can see a disproportionate share of traffic, whereas other flight levels could be almost vacant. Altitude assignments are based upon density distributions occurring in a traffic sample database. This results in aircraft altitudes being distributed in a curve which is appropriate to the operators' preferences.

At a block 60, the flight level that is based upon the probable altitude density distribution curve 20 is verified against RVSM rules. At a block 62, a flight's cruise altitude is read and aircraft are re-assigned to an optimum RVSM flight level. The assignments are based on maintaining approximately the same shape of the probable altitude density distribution curve 20 while filling the new RVSM flight levels. The probable altitude density distribution curve 20 sets RVSM flight level quotas.

At a decision block 64 a determination is made whether the re-assigned RVSM level is above the aircraft's ceiling. If the re-assigned RVSM level is above the aircraft's ceiling, then at a block 66 the aircraft's flight level is re-assigned to the aircraft's ceiling.

If not, then at a decision block 68 a determination is made whether all RVSM flight level quotas are filled. If all RVSM flight level quotas are filled, then processing at the block 54 stops at a block 70.

If not, then at a decision block 72 a determination is made if there are any more aircraft eligible for a flight altitude change. If there are no more eligible aircraft, then processing at the block 54 stops at the block 70. If there are more eligible aircraft, then processing at the block 54 returns to the block 62.

Returning now to FIGS. 1 and 3, the method 50 proceeds from the block 54 to a block 74. At the block 74, weather conditions at the first set of optimum initial cruise altitudes are accounted for to establish the second set of optimum initial cruise altitudes. Processing at the block 74 implements the weather function 22.

At the block 74, the weather data 24 is used to adjust the probable altitude density distribution curve 20 to establish the second set of optimum initial cruise altitudes. Differences between the baseline weather data (including winds and temperatures aloft) from the current weather data are analyzed and the probable flight density curve 20 is adjusted based upon best performance altitudes for the current/expected weather conditions. After the probable flight density curve 20 is adjusted, as part of processing of the block 74 the RVSM altitude assigner (that is, processing described for the block 60) is re-run.

At a block 76, the direction of flight data 28 is used to account for direction of flight to establish the third set of optimum initial cruise altitudes. Direction of flight is based upon the ground track between the departure and arrival airports, adjusted as desired for route segments. The block 76 uses as a starting point the second set of optimum initial cruise altitudes generated at the block 74.

Figure 5:
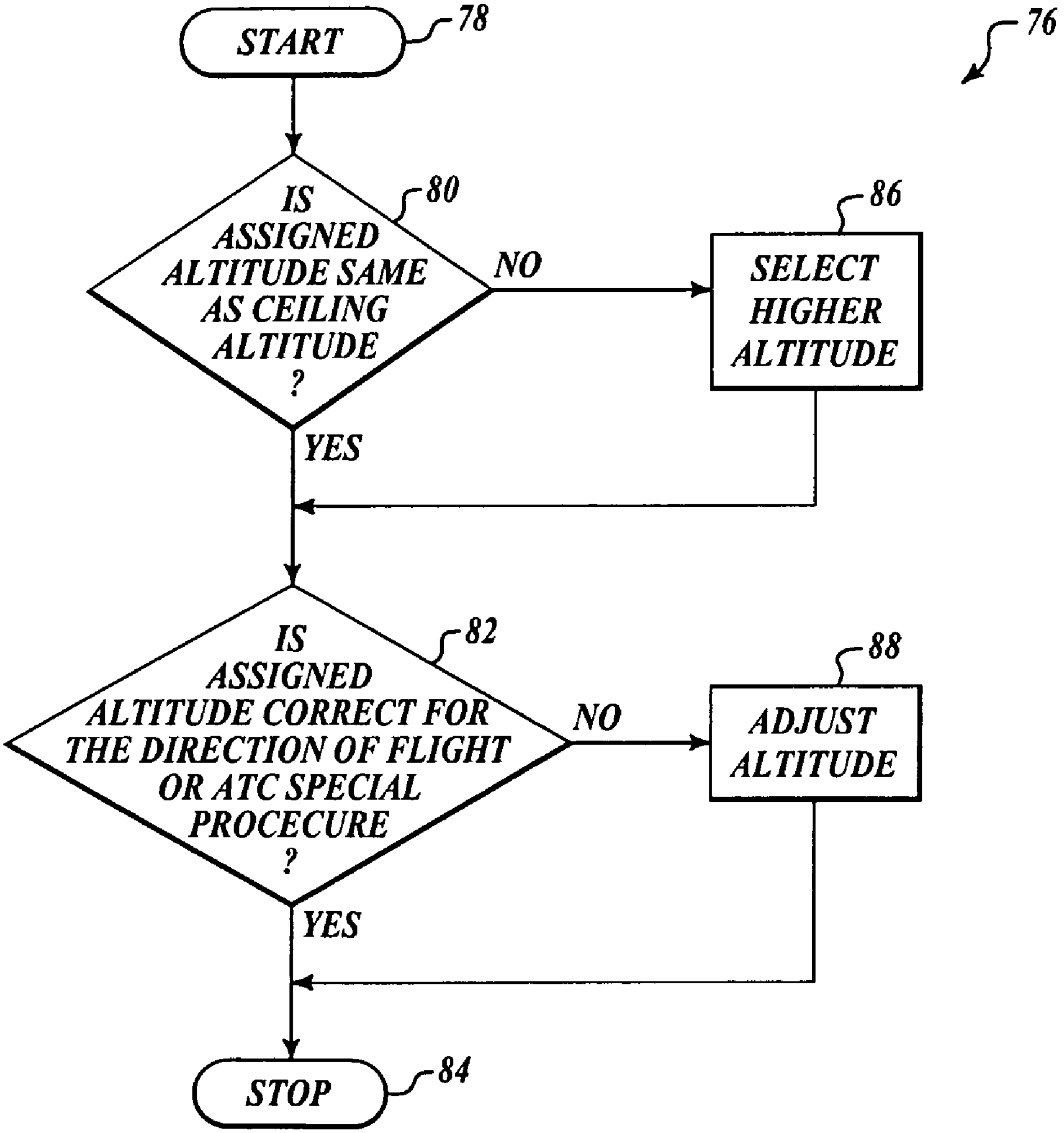

Referring now to FIG. 5, in an exemplary embodiment accounting for the direction of flight at the block 76 starts at a block 78. At a decision block 80 a determination is made whether the assigned altitude from the second set of optimum initial cruise altitudes (from the block 74) is the same as the ceiling altitude. If the assigned altitude is the same as the ceiling altitude, then at a decision block 82 a determination is made whether the assigned altitude is correct for the direction of the flight or for any special Air Traffic Control considerations. If the altitude for direction of flight is correct, then no further action is needed and processing at the block 76 stops at a block 84. If the assigned altitude is not the same as the ceiling altitude, then at a block 86 the higher of the assigned altitude or the ceiling altitude is assigned and processing continues to the decision block 82.

If the altitude for the direction of flight is not correct, then at a processing block 88 the altitude from block 74 is adjusted. For example, if the heading of the flight is in a group of headings (such as, for example, 180-359), then at the block 88 an altitude is re-assigned that is a predetermined difference (such as around 1,000 feet lower) from the altitude re-assigned to a flight having a heading in another group of headings (such as, for example, 180-359). Processing then stops at the block 84.

At a block 90, any conflicts are detected and resolved. Processing at the block 90 uses the airspace constraint data 32 to replicate effects of the first-come, first-served policy used by air traffic controllers. As such, processing at the block 90 implements the conflict detection and resolution function 30. To that end, the objectives of processing at the block 90 are to (1) analyze a set of predicted crossing times where conflicts are likely to occur by analyzing all waypoints along all flight paths that may have conflicts; and (2) conduct a search analysis to determine what combination of altitudes will put the least number of aircraft at lower altitudes to resolve the conflicts.

Figure 6:
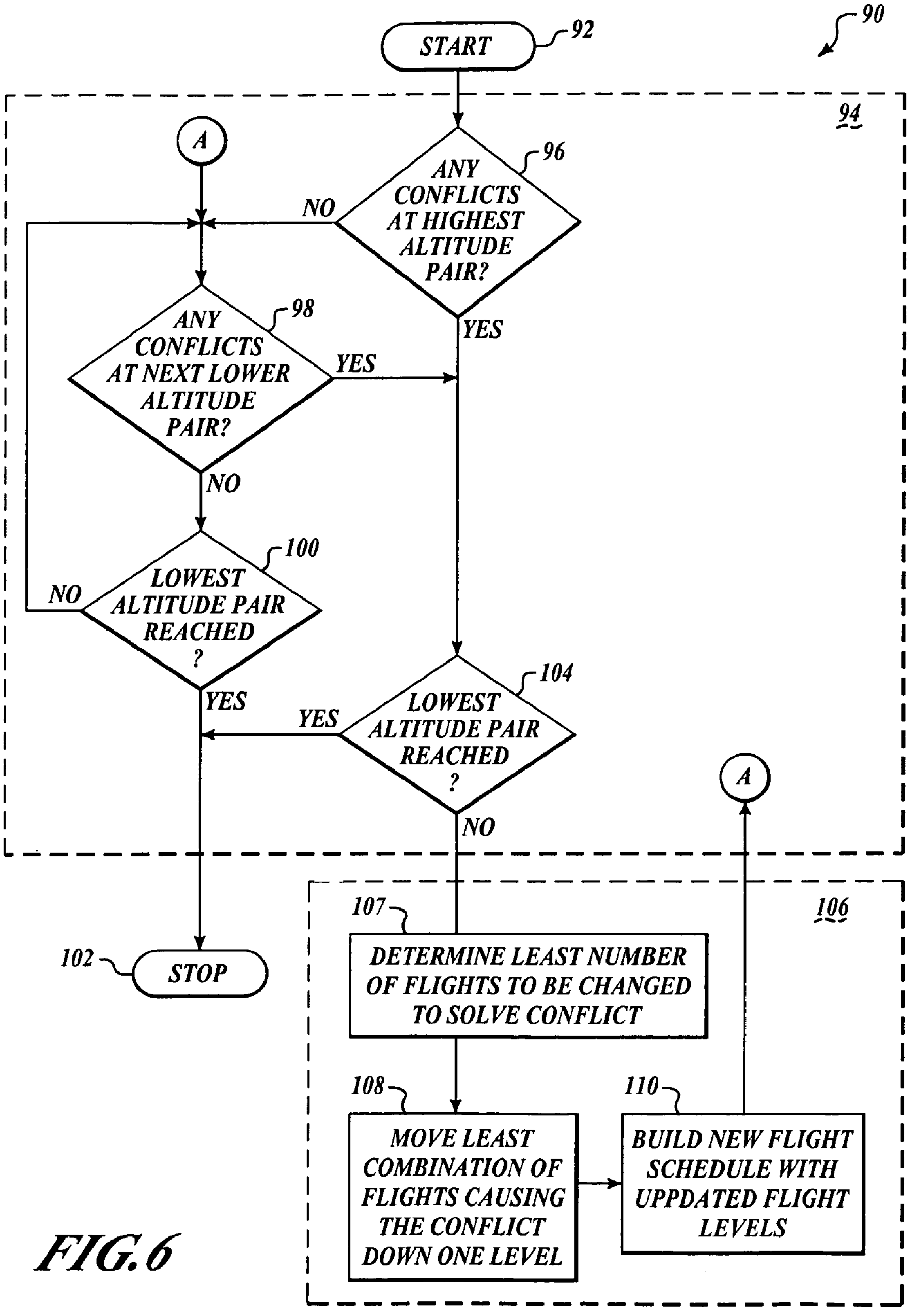

Referring now to FIG. 6, processing at the block 90 starts at a block 92. Any conflicts are detected at a block 94. A conflict exists when two or more aircraft flying at the same altitude are scheduled to arrive at a same waypoint at less than the required spacing. In other words, if the separation time or separation distance between the aircraft is less than the distance/time separation requirement at that waypoint, a conflict exists and must be resolved.

At a decision block 96 a determination is made whether there are any conflicts at a highest altitude pair (such as flight levels 430/420) available in a timetable. The altitudes are set in pairs to account for opposite direction traffic. Because the altitudes do not conflict with each other, computational speed is improved by reducing by a factor of two the number of computations to be run.

Processing at the block 94 works downward until it reaches flight level 200 or another altitude band defined as the lowest altitude in the area of study. To that end, when no conflicts are detected at the highest altitude pair, processing at the block 94 proceeds to a decision block 98. At the decision block 98, a determination is made whether any conflicts are detected at a next lower altitude pair.

If no conflicts are detected at the decision block 98, then a determination is made at a decision block 100 whether the lowest altitude pair in the study has been reached. If so, then processing at the block 90 stops at a block 102. If not, then processing works downward and returns to the decision block 98, at which a determination is made whether any conflicts are detected at a next lower altitude pair.

If conflicts are detected at the decision block 96 or at the decision block 98, then at a decision block 104 a determination is made whether the lowest altitude pair in the study has been reached. If so, then processing at the block 90 stops at the block 102.

If the lowest altitude pair in the study has not been reached, then at a block 106 the detected conflicts are resolved. At a block 107, all flights that are involved in conflict at a flight level, e.g. 430, are examined, and a determination is made of the least number of flights that need to be changed to solve all conflicts at that level. At a block 108, the least combination of flights to resolve conflicts at this level will be moved down one level. Given by way of non-limiting example, a flight having an original altitude of flight level 430 would be moved down one level to an altitude of flight level 410.

At a block 110, a new flight schedule is built with updated flights from the block 108. That is, the fourth set of optimum initial cruise altitudes is established.

Processing at the block 90 returns from the block 106 (that is, conflict resolution) to the block 94 (that is, conflict detection). Specifically, processing returns from the block 110 to the decision block 98, at which a determination is made whether there are any conflicts at the next lower altitude pair level from the block 110. If so, then processing continues at the decision block 104. If not, then continues to the decision block 100. Thus, a final timetable (that is, the fourth set of optimum initial cruise altitudes) will be without any conflicts, or the lowest altitude pair (such as without limitation flight levels 210/200) will have been reached, or any remaining conflicts will be resolved by different means such as a route change or ground delay.

Returning now to FIGS. 1 and 3, processing of the method 50 turns to implementing the network communications function 16. To that end, at a block 114 data is distributed to stakeholders via network-enabled applications. The data that is distributed at the block 114 will be either data regarding the third set of optimum initial cruise altitudes from the block 76 or, if any conflicts have been resolved, the fourth set of optimum initial cruise altitudes from the block 90.

Data may be distributed at the block 114 in any suitable manner as desired. Given by way of non-limiting example, data may be distributed over a network to users who have subscribed to the data. As another non-limiting example, data may be distributed as set forth in U.S. patent application publication no. 2006/0069497 entitled "Tracking, Relay, and Control Information Flow Analysis Process for Information-Based Systems" and assigned to The Boeing Company, the entire contents of which are hereby incorporated by reference.

The stakeholders may provide feedback regarding the distributed data. The stakeholders may review the data to which they have subscribed and formulate any desired trajectory requests, changes to route assignments, changes to altitude assignments, or the like. For example, an operator may desire, for one reason or another, to have longer flights flown at higher altitudes than shorter flights. To that end, at a decision block 116 a determination is made whether any operator preferences for route and altitude assignments have been received, thereby implementing the user feedback function 38.

If any operator preferences for route and altitude assignments have been received, then at a block 118 operator preferences for route and altitude assignments are incorporated. The block 118 implements the replanning function 40 by returning processing of the method 50 back to the block 74. If no operator preferences for route and altitude assignments are received, then processing of the method 50 stops at a block 120.

Exemplary Host Environment

Figure 7:
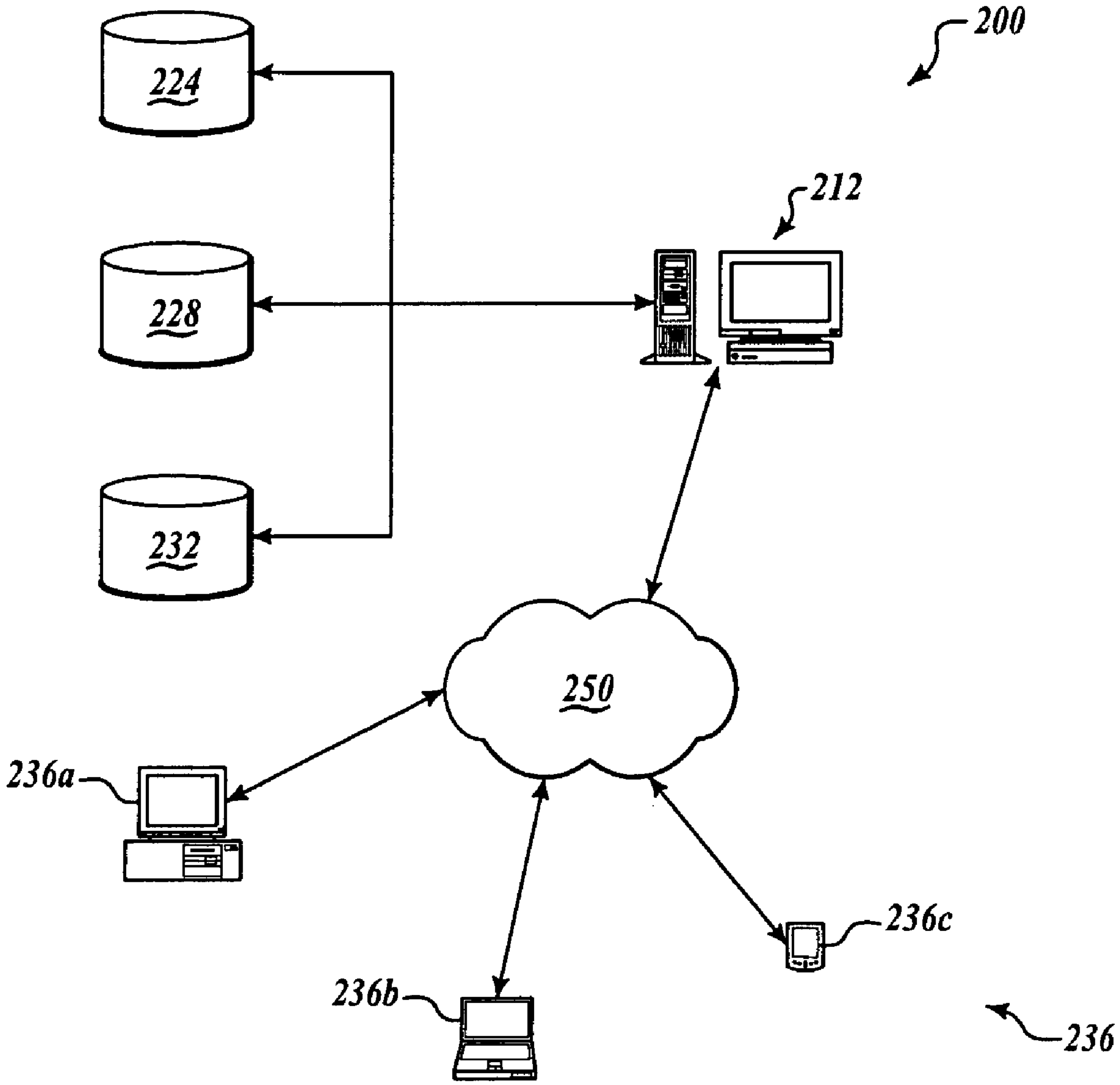
FIG. 7 is a block diagram of an exemplary host environment for a system for hosting the functions shown in FIG. 1.

Referring now to FIGS. 1, 3, and 7, an exemplary system environment 200 suitably may host the exemplary functionality described above for optimizing cruise altitudes for multiple aircraft. Reference numbers used in reference to components of the system environment 200 are similar to reference numbers used in reference to corresponding functionality shown in FIG. 1.

The processing functions 12 are executed by a processing component 212. The processing component 212 suitably is any computer processor, such as a desktop computer, a workstation, a laptop computer, a palmtop computer, or the like. While the processing component 212 as shown in FIG. 7 illustrates the processing functions 12 being centralized within one processor, processing within the system environment 200 may be distributed among as many processors as desired. Thus, hosting the processing functions 12 is not to be construed as being limited to the exemplary, non-limiting embodiment of the system environment 200 shown in FIG. 7

A weather data repository 224, a direction of flight repository 228, and an airspace constraint data repository 232 store their respective data as described above. As shown in FIG. 7, the processing component 212 can access the data input 14 directly from the weather data repository 224, the direction of flight repository 228, and the airspace constraint data repository 232, as desired.

The processing component 212 is coupled in data communications with a network 250, such as a local area network (LAN), a wide area network (WAN), an intranet, the Internet, or the like. In another embodiment (not shown), the processing component 212 can also access the data input 14 via the network 250. That is, the processing component 212 can access via the network 250 the data input 14 from the weather data repository 224, the direction of flight repository 228, and the airspace constraint data repository 232, as desired. The processing component 212 can also distribute data regarding the third or fourth sets of optimum initial cruise altitudes, as discussed above, via the network 250.

User applications 236 can subscribe to the data as described above. The user applications 236 can receive the distributed data via the network 250. The user applications 236 also can access weather data from the weather data repository 224 via the network 250 and the processing component 212. The user applications also can provide feedback via the network 250. The user applications 236 can be executed on any processing platform as desired, such as without limitation a desktop computer 236A, a laptop computer 236B, a palmtop computer 236C, or the like.

In various embodiments, portions of the system and method include a computer program product. The computer program product includes a computer-readable storage medium, such as the non-volatile storage medium, and computer-readable program code portions, such as a series of computer instructions, embodied in the computer-readable storage medium. Typically, the computer program is stored and executed by a processing unit or a related memory device, such as the processing component 212 depicted in FIG. 7.

In this regard, FIGS. 1 and 3-7 are block diagrams and flowcharts of methods, systems and program products according various embodiments. It will be understood that each block of the block diagrams and flowcharts and combinations of blocks in the block diagrams and flowcharts can be implemented by computer program instructions. These computer program instructions may be loaded onto a computer or other programmable apparatus to produce a machine, such that the instructions which execute on the computer or other programmable apparatus create means for implementing the functions specified in the block diagrams or flowchart blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the block diagrams or flowchart blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagrams or flowchart blocks.

Accordingly, blocks of the block diagrams or flowcharts support combinations of means for performing the specified functions, combinations of steps for performing the specified functions and program instruction means for performing the specified functions. It will also be understood that each block of the block diagrams or flowcharts, and combinations of blocks in the block diagrams or flowcharts, can be implemented by special purpose hardware-based computer systems which perform the specified functions or steps, or combinations of special purpose hardware and computer instructions.

While a number of exemplary embodiments and aspects have been illustrated and discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed is:

1. A computer-executable method for determining cruise altitudes for a plurality of flights, the method comprising:

establishing a first set of cruise altitudes for a plurality of flights by assigning each of the plurality of flights in a set of scheduled flights to each flight's own flight level based upon a probable altitude density distribution curve;

accounting for weather conditions at the first set of cruise altitudes to establish a second set of cruise altitudes;

accounting for direction of flight at the second set of cruise altitudes to establish a third set of cruise altitudes;

determining whether a conflict exists between two or more of the plurality of flights at the third set of cruise altitudes; and when a conflict is detected, resolving the conflict to establish a fourth set of cruise altitudes.

2. The method of claim 1, further comprising distributing, to at least one user, data regarding altitudes chosen from the third set of cruise altitudes and the fourth set of cruise altitudes.

3. The method of claim 2, further comprising:

receiving, from at least one user, preference data regarding at least one user preference chosen from route assignment and altitude assignment; and accounting for the received user preference data to establish a fifth set of cruise altitudes.

4. The method of claim 1, wherein establishing the first set of cruise altitudes further includes re-assigning each flight's own flight level based upon the probable altitude density distribution curve to account for reduced vertical separation minima flight rules.

5. The method of claim 4, wherein accounting for the weather conditions adjusts the probable altitude density distribution curve based upon the weather conditions.

6. The method of claim 1, wherein the weather conditions include at least one weather condition chosen from wind conditions at cruise altitude, temperatures at cruise altitude, thunderstorm activity, and turbulence.

7. The method of claim 1, wherein the weather conditions include at least one set of weather conditions chosen from forecast weather conditions and observed weather conditions.

8. The method of claim 1, wherein accounting for the direction of flight includes:

assigning to a first flight a higher altitude chosen from an altitude from the second set of cruise altitudes and a performance ceiling of an aircraft assigned to the first flight; and assigning an adjusted altitude to the first flight when the assigned altitude is not a standard altitude for the direction of flight.

9. The method of claim 8, wherein assigning the adjusted altitude includes assigning an altitude to the first flight having a heading between 000 and 179 that is a predetermined difference lower than an altitude assigned to another flight having a heading between 180 and 359.

10. The method of claim 9, wherein the predetermined difference is around 1,000 feet.

11. The method of claim 1, wherein determining whether a conflict exists includes determining whether at least two of the plurality of flights at a same altitude are scheduled to arrive at a same waypoint at less than a predetermined difference in at least one parameter chosen from time and distance.

12. The method of claim 11, wherein determining whether a conflict exists includes checking for conflicts in a pair of altitude levels at a time.

13. The method of claim 12, wherein resolving the conflict includes re-assigning altitudes to a least number of flights to resolve the conflict.

14. The method of claim 13, wherein one or more of the plurality of flights are re-assigned to one altitude level lower than the same altitude.

15. The method of claim 1, wherein the first set of cruise altitudes for the plurality of flights comprises an optimum set of cruise altitudes.

16. A system for determining cruise altitudes for a plurality of flights, the system comprising:

a first processing component configured to establish a first set of cruise altitudes for a plurality of flights;

a second processing component configured to account for weather conditions at the first set of cruise altitudes to establish a second set of cruise altitudes;

a third processing component configured to account for direction of flight at the second set of cruise altitudes to establish a third set of cruise altitudes, wherein the third processing component establishes the third set of cruise altitudes by:

assigning to a first flight a higher altitude chosen from an altitude from the second set of cruise altitudes and a performance ceiling of an aircraft assigned to the first flight; and assigning an adjusted altitude to the first flight when the assigned altitude is not a standard altitude for the direction of flight;

a fourth processing component configured to determine whether a conflict exists between two or more of the plurality of flights at the third set of cruise altitudes; and a fifth processing component configured to, when a conflict is detected, resolve the conflict to establish a fourth set of cruise altitudes.

17. The system of claim 16, further comprising a network communications component configured to distribute, to at least one user, data regarding altitudes chosen from the third set of cruise altitudes and the fourth set of cruise altitudes.

18. The system of claim 17, further comprising a sixth processing component configured to account for received user preference data to establish a fifth set of cruise altitudes.

19. The system of claim 16, wherein the first processing component is further configured to assign each flight in the set of scheduled flights to each flight's own flight level based upon a probable altitude density distribution curve.

20. The system of claim 19, wherein the first processing component is further configured to re-assign the flight level based upon the probable altitude density distribution curve to account for reduced vertical separation minima flight rules.

21. The system of claim 20, wherein the second processing component is further configured to adjust the probable altitude density distribution curve based upon the weather conditions.

22. The system of claim 16, wherein the weather conditions include at least one weather condition chosen from wind conditions at cruise altitude, temperatures at cruise altitude, thunderstorm activity, and turbulence.

23. The system of claim 16, wherein the weather conditions include at least one set of weather conditions chosen from forecast weather conditions and observed weather conditions.

24. The system of claim 16, wherein assigning the adjusted altitude to the first flight when the assigned altitude is not a standard altitude for the direction of flight includes assigning an altitude to the first flight having a heading between 000 and 179 that is a predetermined difference lower than an altitude assigned to another flight having a heading between 180 and 359.

25. The system of claim 24, wherein the predetermined difference is around 1,000 feet.

26. The system of claim 16, wherein the fourth processing component is further configured to determine whether at least two of the plurality of flights at a same altitude are scheduled to arrive at a same waypoint at less than a predetermined difference in at least one parameter chosen from time and distance.

27. The system of claim 26, wherein the fourth processing component is further configured to check for conflicts in a pair of altitude levels at a time.

28. The system of claim 27, wherein the fifth processing component is further configured to re-assign altitudes to a least number of the plurality of flights to resolve the conflict.

29. The system of claim 28, wherein one or more of the plurality of flights are re-assigned to one altitude level lower than the same altitude.

30. The system of claim 16, wherein the first set of cruise altitudes for the plurality of flights comprises an optimum set of cruise altitudes.

31. A computer-readable storage medium storing instructions executable by a computing system, the computer-readable storage medium comprising:

first computer program code means for establishing a first set of cruise altitudes for a plurality of aircraft by assigning each flight in a set of scheduled flights to each flight's own flight level based upon a probable altitude density distribution curve;

second computer program code means for accounting for weather conditions at the first set of cruise altitudes to establish a second set of cruise altitudes;

third computer program code means for accounting for direction of flight at the second set of cruise altitudes to establish a third set of cruise altitudes;

fourth computer program code means for determining whether a conflict exists between two or more of the plurality of flights at the third set of cruise altitudes; and fifth computer program code means for, when a conflict is detected, resolving the conflict to establish a fourth set of cruise altitudes.

32. The computer-readable storage medium of claim 31, further comprising sixth computer program code means for distributing, to at least one user, data regarding altitudes chosen from the third set of cruise altitudes and the fourth set of cruise altitudes.

33. The computer-readable storage medium of claim 32, further comprising seventh computer program code means for accounting for received user preference data to establish a fifth set of cruise altitudes.

34. The computer-readable storage medium of claim 31, wherein the first computer program code means further re-assigns the flight level that is based upon the probable altitude density distribution curve to account for reduced vertical separation minima flight rules.

35. The computer-readable storage medium of claim 34, wherein the second computer program code means adjusts the probable altitude density distribution curve based upon the weather conditions.

36. The computer-readable storage medium of claim 31, wherein the weather conditions include at least one weather condition chosen from wind conditions at cruise altitude, temperatures at cruise altitude, thunderstorm activity, and turbulence.

37. The computer-readable storage medium of claim 31, wherein the weather conditions include at least one set of weather conditions chosen from forecast weather conditions and observed weather conditions.

38. The computer-readable storage medium of claim 31, wherein the third computer program code means includes:

seventh computer program code means for assigning to a first flight a higher altitude chosen from an altitude from the second set of cruise altitudes and a performance ceiling of the aircraft assigned to the first flight; and eighth computer program code means for assigning an adjusted altitude when the assigned altitude is not a standard altitude for the direction of flight.

39. The computer-readable storage medium of claim 38, wherein the eighth computer program code means further assigns an altitude to the first flight having a heading between 000 and 179 that is a predetermined difference lower than an altitude assigned to another flight having a heading between 180 and 359.

40. The computer-readable storage medium of claim 39, wherein the predetermined difference is around 1,000 feet.

41. The computer-readable storage medium of claim 31, wherein the fourth computer program code means determines whether at least two aircraft at a same altitude are scheduled to arrive at a same waypoint at less than a predetermined difference in at least one parameter chosen from time and distance.

42. The computer-readable storage medium of claim 41, wherein the fourth computer program code means checks for conflicts in a pair of altitude levels at a time.

43. The computer-readable storage medium of claim 42, wherein the fifth computer program code means re-assigns altitudes to a least number of flights to resolve the conflict.

44. The computer-readable storage medium of claim 43, wherein the flights are re-assigned to one altitude level lower than the same altitude.

45. The computer-readable storage medium of claim 31, wherein the first set of cruise altitudes for the plurality of flights comprises an optimum set of cruise altitudes.

* * * * *

UNITED STATES PATENT AND TRADEMARK OFFICE

CERTIFICATE OF CORRECTION

PATENT NO. : 7,623,957 B2
APPLICATION NO. : 11/515121
DATED : November 24, 2009
INVENTOR(S) : Bui et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 587 days.

Signed and Sealed this

Fourteenth Day of December, 2010

David J. Kappos
*Director of the United States Patent and Trademark Office*